Figure 1:
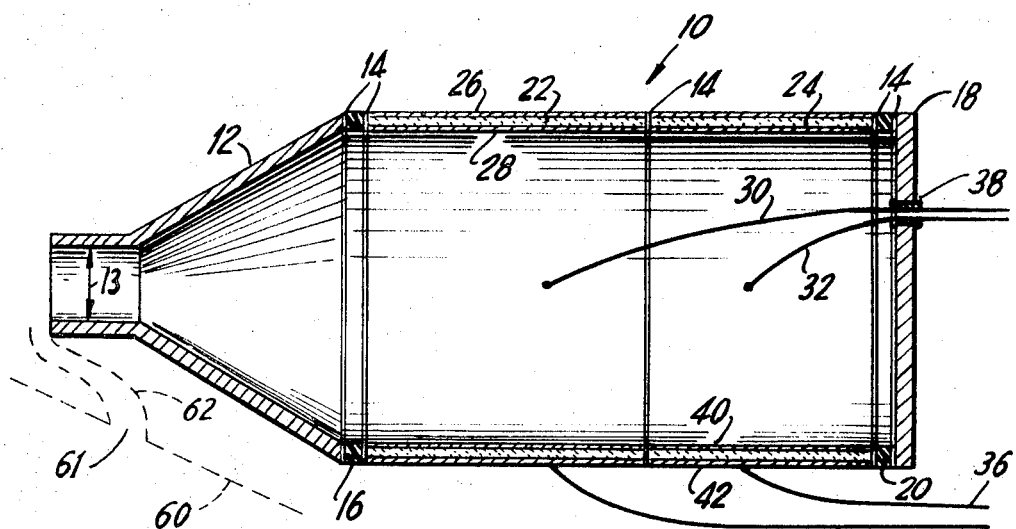

United States Patent [19]

Bernstein

[11] 3,748,502

[45] July 24, 1973

[54] PIEZOELECTRIC HELMHOLTZ RESONATOR FOR ENERGY CONVERSION

[75] Inventor: Julius Bernstein, Beechhurst, N.Y.

[73] Assignee: Edo Corporation, College Point, N.Y.

[22] Filed: Aug. 4, 1971

[21] Appl. No.: 169,111

Related U.S. Application Data

[63] Continuation of Ser. No. 3,249, Jan. 15, 1970, abandoned.

[52] U.S. Cl.................. 310/8, 310/8.2, 310/9.6, 310/9.8, 73/194
[51] Int. Cl............................................ H04r 17/00
[58] Field of Search................ 310/8, 8.1, 8.2–8.7; 417/322

[56] References Cited
UNITED STATES PATENTS 3,150,592 9/1964 Stec ................................. 310/8 X
3,215,078 11/1965 Stec ................................. 310/8 X

*Primary Examiner*—J. D. Miller
*Assistant Examiner*—Mark O. Budd
*Attorney*—Davis, Hoxie, Faithfull & Hapgood

[57] ABSTRACT

A Helmholtz resonator comprising an orifice and an otherwise enclosed volume includes one or more cascaded hollow piezoelectric cylinders. The resonator effects a conversion between an air flow and electrical energy, one energy form being applied as an input to excite the resonator and the other energy form being directly derivable as an output.

9 Claims, 3 Drawing Figures

PATENTED JUL 24 1973　　3,748,502

INVENTOR.
JULIUS BERNSTEIN
BY
Davis, Hoxie, Faithfull & Hapgood
ATTORNEYS

PIEZOELECTRIC HELMHOLTZ RESONATOR FOR ENERGY CONVERSION

RELATED APPLICATIONS

This application is a continuation of Ser. No. 3,249 filed Jan. 15, 1970, now abandoned.

This invention relates to conversion apparatus and, more specifically, to a piezoelectric Helmholtz resonator for converting between an air (or other fluid) flow and electrical energy.

It is desirable for some applications to employ apparatus for directly converting between the kinetic energy of a fluid flow and electrical energy. For example, an electrical voltage source is required to arm and detonate proximity, delayed, and similar fusing circuits in artillery projectiles. By the physical constraints of the situation, the projectile must contain its own power source and, accordingly, carries batteries to activate the detonator circuitry.

However, there are several deficiencies associated with battery powered projectiles, e.g., the batteries deteriorate with time or severe environmental exposure, and a projectile which includes a battery may inadvertently detonate upon receiving a sharp impact.

In accordance with the present invention, the battery can be eliminated, and the projectile rendered fail-safe, by energizing the projectile arming electronics with a converter which provides an electrical output responsive to the air flow past the fired shell. Similar utility exists for powering varying functional circuits on other vehicles moving in air, or circuits used where an air flow is readily accessible.

Correspondingly, it is often desirable to provide and use a moving air flow, as to cool electrical circuitry. A motor driven blower is typically employed to effect the requisite air flow, but motors often fail in time by reason of various mechanical malfunctions thus causing circuit components to overheat and fail. The problem is especially pronounced where the electronic apparatus is enclosed in a sealed cabinet, or is otherwise inaccessible. The fan is often the least reliable element in the enclosure and thus limits the useful life and/or reliability of the electronics associated therewith.

It is thus an object of the present invention to provide improved energy conversion apparatus.

More specifically, an object of the present invention is the provision of reliable apparatus for converting between electrical energy and the kinetic energy of an air flow.

The above and other objects are realized in illustrative energy converting apparatus which employs a Helmholtz resonator including a piezoelectric structural element, the resonator defining a closed volume having an orifice in one end thereof. A suitable air flow is directed across the orifice and induces a mechanical oscillation within the body of the resonator at a natural frequency thereof, thereby inducing periodic mechanical stress perturbations within the piezoelectric material.

An alternating current potential is developed between two electrodes disposed on opposite surfaces of the piezoelectric material responsive to the periodic stress variation. The alternating current potential may be employed to drive a suitable load, or may be rectified and passed through a low pass filter to energize a load with a direct current potential.

By employing the inverse actuation, i.e., by supplying an alternating current signal corresponding to a resonance frequency of the Helmholtz resonator to the two electrodes, a mechanical resonance is effected. The resonator thereby generates an air flow which exits from the resonator orifice. The air flow may be employed for any desired purpose, e.g., for circuit cooling.

Figure 2:
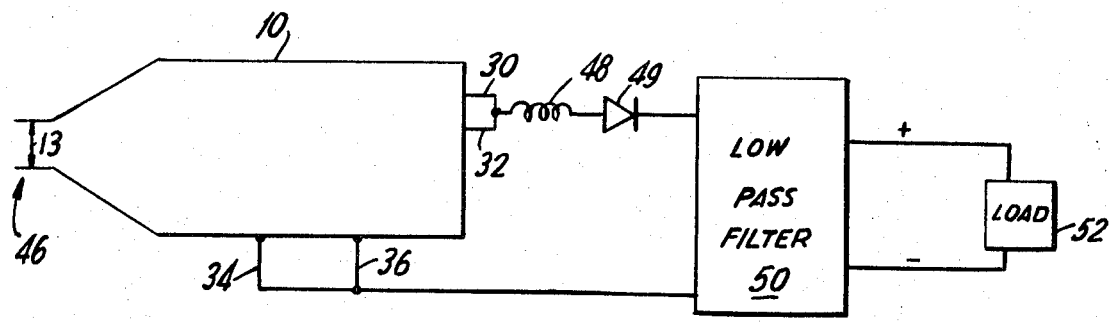
Figure 3:
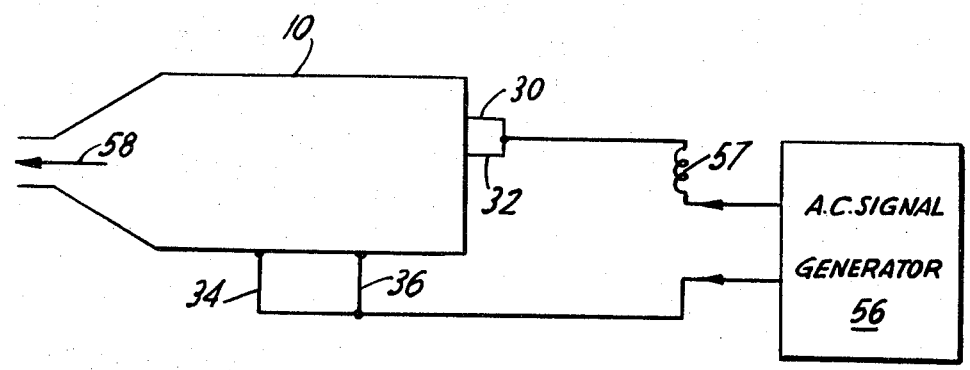

The above and other objects, features and advantages of the present invention are realized in illustrative energy converting apparatus, described herein-below in conjunction with the accompanying drawing, in which:

FIG. 1 illustrates in cross-section a Helmholtz resonator, employing a piezoelectric material, which embodies the principles of the present invention;

FIG. 2 schematically depicts the resonator of FIG. 1 employed to provide output electrical energy responsive to an incident air flow; and FIG. 3 schematically depicts the resonator of FIG. 1 employed to produce an output air flow responsive to an input electrical energization.

Referring now to FIG. 1, there is shown a Helmholtz resonator 10 including a first, tapered end section 12 which includes an orifice 13, and a second end portion 18, e.g., both formed of aluminum or other material. Disposed intermediate the resonator end sections 12 and 18 are two hollow piezoelectric cylinders 22 and 24, e.g., formed of barium titanate or lead zirconate. The piezoelectric cylinders 22 and 24 have coated thereon outer silvered electrode surfaces 26 and 42, and inner silvered electrode surfaces 28 and 40, respectively. Any number of piezoelectric cylinders (or only one) may be cascaded together within the resonator 10 for increased energy converting capacity.

Two spacers 16 and 20 separate the piezoelectric material from the end resonator sections 12 and 18, the spacers preferably being of a resilient insulating material such as rubber, an elastomer, a cork-like material or the like. The several resonator members are secured together by an insulating cement 14 such as an epoxy resin.

The insulating spacers 16 and 20, and the several cement joints 14, do not short circuit the electrode surfaces 26, 28, 40 and 42, and, moreover, inhibit the metallic end members 12 and 18 from spuriously interconnecting these conductors. The inner and outer electrode surfaces must be electrically isolated or the converter is disabled — all four surfaces must be isolated for serial electrical operation. The resilient nature of the spacers mechanically "floats" the piezoelectric cylinders 22 and 24 relative to the end members 12 and 18, i.e., allows the members 22 and 24 to expand and contract, and to thereby provide energy conversion in a relatively efficient manner as discussed below.

Finally, conductors 30, 34, 32 and 36 are connected to the electrode surfaces 28, 26, 40, and 42, respectively, the inner conductors 30 and 32, insulated from each other, passing through a seal 38 (a grommet or the like) about an aperture within the resonator member 18. The wires 30 and 32, and 34 and 36 may be interconnected to provide parallel electrical operation of the cylinders 22 and 24 (corresponding to a relatively low impedance, low voltage and a relatively high current output or input), or the wires 30 and 36, or 34 and 32 can be connected (relatively high impedance, high voltage, low current output or input) to effect series cylinder operation.

As is well known, the Helmholtz resonator of FIG. 1 has a plurality of natural mechanically resonant frequencies when excited, the different frequencies corresponding to differing vibrational modes (e.g., sinusoidally varying axial length, diameter and the like). The specific frequency values depend upon the mechanical resonator configuration, e.g., its dimensions, thickness, bulk material properties and the like.

When air of a suitable velocity and incident angle is directed across the orifice 13, the resonator 10 will resonate in a corresponding mode thereby impressing periodic sinusoidal stress variations in the cylinders 22 and 24. By reason of their piezoelectric properties, the cylinders 22 and 24 induce like phased bipolar sinusoidal voltages between the conducting electrode surfaces 26 and 28, and 42 and 40, and thereby also between the wires 34 and 30, and 36 and 32, respectively. These alternating current potentials may be employed per se to drive the same or different loads, or may be connected in series or parallel as described above to increase the voltage or current output of the resonator 10.

Alternatively, a sinusoidal electric potential corresponding to selected of the natural frequencies of the resonator 10 (or a periodic waveform having a Fourier component at such a frequency) may be applied via the conductors 30–34 and 32–36 to the electrodes 28–26 and 40–42. Accordingly, stresses are produced in the piezoelectric cylinders 22 and 24 which cause the unit 10 to resonate at the applied frequency. The vibration of the resonator walls at selected ones of the resonator natural frequencies causes an air movement outward through the resonator orifice 13.

An air (or other fluid) flow-to-electrical output converter employing the resonator 10 is schematically shown in FIG. 2, the output electrodes 30–32 and 34–36 being connected for parallel operation for convenience. An air flow 46 past the resonator aperture 13 induces an alternating current potential between the output electrodes as discussed above. The flow 46 may be provided by a compressed air source, or by motion of the resonator 10 relative to a surrounding air environment. Thus, for example, the resonator may be located inside an artillery projectile with the orifice 13 comprising an opening on the surface of the shell (or such an opening connected by a conduit to direct air past an internally located orifice 13). FIG. 1, for example, shows in dotted line form the surface of an artillery projectile 60 having opening 61 connected by conduit 62 to direct air flowing past said opening past the orifice 13.

The alternating potential may be utilized to energize a load directly, or via a series inductor. Alternatively, the potential may be converted to direct current form as by a rectifier 49 and a low pass filter 50.

A series inductance 48 is employed to develop a reactance at the operative resonance frequency which offsets, or at least partially cancells the capacitive reactance exhibited by resonator 10. The effective electrical output of the resonator 10 is thus converted from a high reactive impedance to a low impedance of small phas angle, hence greatly increasing the power supplied by the resonator 10 to a low impedance load.

The potential developed by the resonator 10 connected as in FIG. 2 may drive any suitable load, such as a projectile detonator circuit. When employed in an artillery projectile application, the unipolar potential generating apparatus of FIG. 2 is fail-safe, the threshold air flow required for detonation being made sufficiently great as to be unobtainable until the projectile has actually been fired and has left the firing weapon. Further, the apparatus can be stored indefinitely, and under adverse conditions, without loss of potency.

An electrical eneryg-to-air flow converter is schematically shown in FIG. 3, and includes a signal generator 56 driving the resonator with a sinusoidal signal (or signal component) corresponding to a resonator resonance frequency. A series inductor 57 may advantageously be employed to offset the large capacitive reactance of the resonator 10 thereby increasing its energy transfer efficiency in a manner directly analogous to that described above for the arrangement of FIG. 2. As discussed above, the resonator 10 responds to the input energization by generating an outward output air flow 58 through the orifice 13. For the above-described cooling application, the air flow may be directed at a heat producing electrical component to provide circulation thereabout, or may be directed along the surface of a metallic enclosure to increase heat transfer through the enclosure.

Thus, the Helmholtz resonator 10 of FIG. 1 has been shown by the above to effect a direct conversion between energy forms. The conversion apparatus is free of any moving parts in the conventional sense, and exhibits a reliability comparable to the solid state components with which it may often be associated.

The above-described resonator construction and ancillary apparatus is merely illustrative of the principles of the present invention. Numerous modifications and adaptations thereof will be readily apparent to those skilled in the art without departing from the spirit and scope of the present invention. For example, the active piezoelectric cylinders 22 and 24 can be formed of the well known "striped" cylinder or ring construction ($k_{33}$ mode vis.-a-vis. the $k_{31}$ mode considered above).

What is claimed is:

1. A Helmholtz resonator for converting between kinetic fluid energy and electrical energy, comprising first and second resonator end means and a Helmholtz resonator cavity therebetween, a hollow piezoelectric element disposed between said resonator end means and defining the side enclosure of said resonator cavity, first and second electrode means located respectively on the outer and inner surfaces of said hollow piezoelectric element, conductors connected to said electrodes, said first end means having an orifice therein, said second end means defining a cavity closure, and means for directing a fluid flow across said orifice, such that fluid flow across said orifice induces oscillations within the resonator cavity to induce periodic stress variations in the piezoelectric element and a voltage across said electrodes.

2. A combination as in claim 1 for arming an artillery projectile, further comprising an aperture located on the surface of said projectile such that a portion of the air flow past said aperture flows across said orifice, and circuitry connected to said conductors, said circuitry being activated when a voltage is induced across said conductors.

3. A combination as in claim 1, further comprising resilient insulating means spacing said piezoelectric element from said first and second end means.

4. A combination as in claim 1, wherein the orifice in said first end means has a cross-sectional area constricted from the cross-sectional area of said hollow piezoelectric element.

5. A combination as in claim 1 further comprising an electrical load connected to said conductors.

6. A combination as in claim 5 further comprising a rectifier and a low pass filter connected between one of said conductors and said load.

7. A combination as in claim 1 further comprising an inductance connected to one of said conductors.

8. A combination as in claim 7 wherein said resonator comprises a capacitive reactance at a natural resonance frequency, and wherein said inductance exhibits a substantially like absolute magnitude reactance at said frequency.

9. A combination as in claim 1 wherein said piezoelectric member comprises a plurality of hollow piezoelectric segments adhered together.

* * * * *